Figure 1:
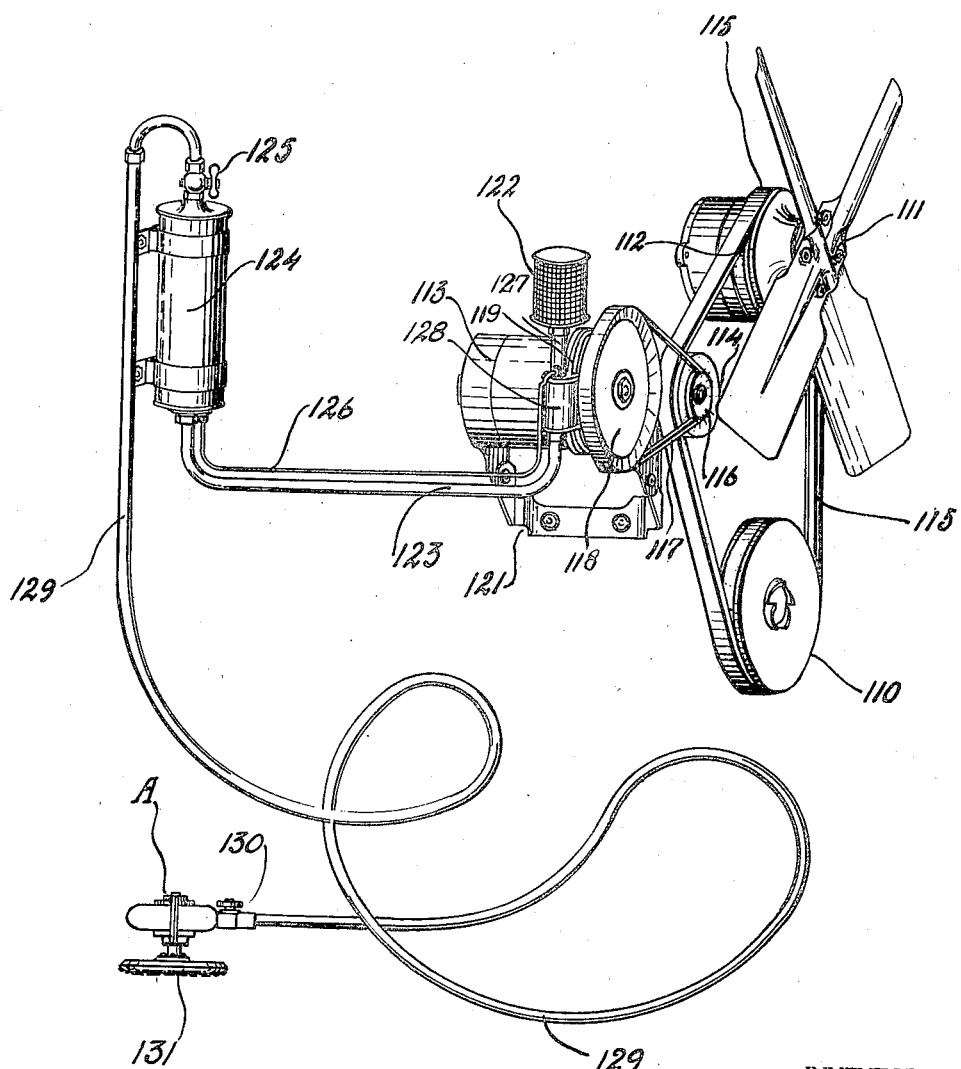

Patented Aug. 20, 1940

2,211,814

UNITED STATES PATENT OFFICE 2,211,814

POWER ACTUATED DEVICE

Leon J. L. Geeraert and William Lush,
New York, N. Y.

Application December 9, 1937, Serial No. 178,874

7 Claims. (Cl. 121—86)

The present invention relates to power-driven devices and it particularly relates to devices of the type which may derive their power from automobile engines.

Although not restricted thereto, the present invention will be particularly directed to the employment of the automobile engine as a power source for actuating various types of devices, such as polishing, pumping, cleaning, sawing, lifting, abrading, cutting and so forth and it will be particularly directed to the actuation of devices of this character by fluid pressure or pneumatic arrangements.

Although the present invention will be particularly discussed in connection with power derived from an automobile engine, it is to be understood that the various elements thereof may also be actuated by power derived in other manners and/or from other sources.

The automobile engine is usually a most readily available source of power and it is often desirable to use such automobile engine while in position in an automobile chassis or removed therefrom to drive and actuate various types of devices and enable the carrying out of various processes which now normally require manual labor.

It is therefore among the objects of the present invention to provide an improved system and arrangement for deriving power from an automotive engine, according to which the power will be readily obtained without substantial loss and without derangement or disfigurement of the automobile engine or other source of power supply.

Another object is to provide an improved system and apparatus by means of which power derived from an automobile engine or other similar source of power supply may be conveniently utilized to actuate polishing, pumping, cleaning, sawing, lifting, abrading, cutting, fitting and other devices.

Still another object of the present invention is to provide an improved arrangement and system for deriving power for actuation of the various devices above described and for carrying out the methods above referred to, which will enable utilization of a portable source of power supply.

In accomplishing the above objects, it has been found most suitable to provide an air motor which may be actuated directly or indirectly from an automobile engine, and it is among the further objects of the present invention to provide an improved air motor or air pump which function for the purposes above described.

Other objects will be obvious or will be apparent during the course of the following specification.

In accomplishing the above objects it has been found most suitable to provide the air pump or motor in such a connection that it may be actuated by a conduit which may be detachably connected to a source of high pressure fluid or air supply in and about the automotive engine.

The pneumatic source may be associated with or driven from or actuated by the fan shaft, the generator shaft or other auxiliary shafts in and around the automotive engine and a conduit from this air shaft may extend to the casing of an air motor, which preferably is of the eccentric variety and has a rotating vane or piston upon which the pneumatic pressure will act to give the rotary movement. A reciprocating piston device may also be utilized, if desired. The piston element is preferably held in a rotating member, which rotating member may be connected with a drive or driven shaft through which power is communicated to the desired instrumentality.

Figure 2:
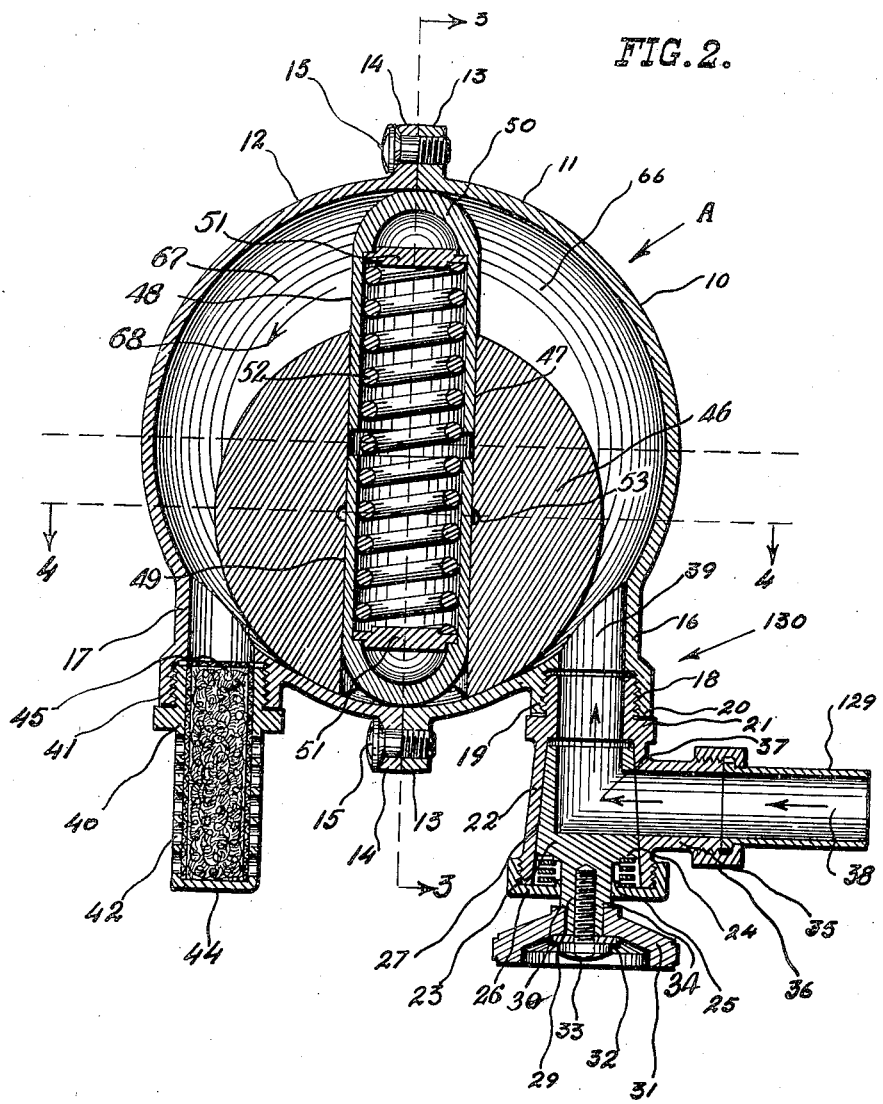
Figure 3:
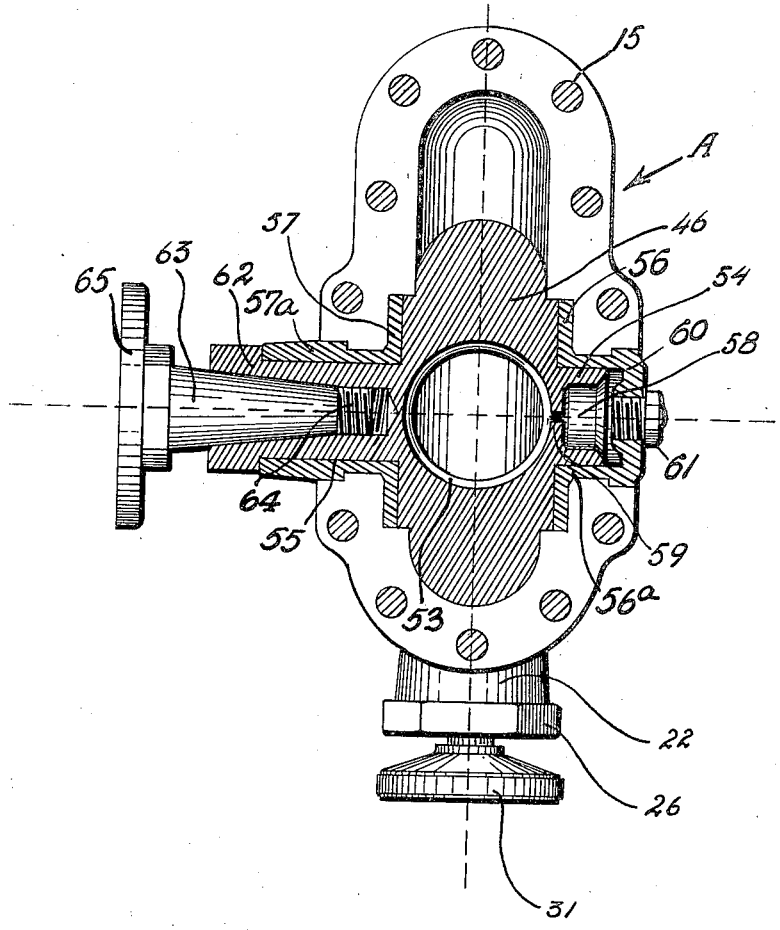
Figure 4:
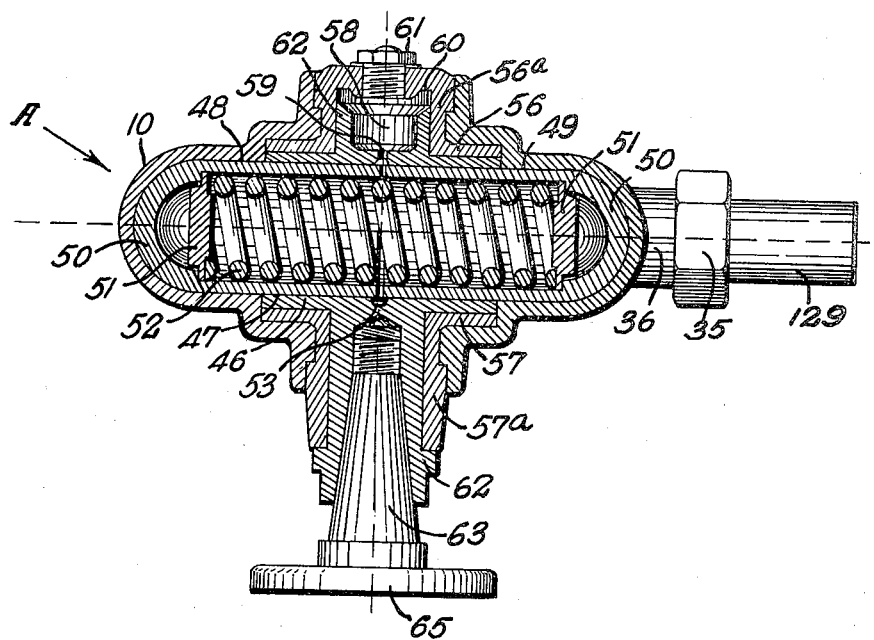

In the drawings which show one of the various forms of the present invention, but to which the invention is by no means restricted, since many changes and alterations may be made therein, all within the scope of the present invention:

Fig. 1 is a diagrammatic fragmentary perspective view showing a portion of the automotive engine with its appurtenances and also the polishing device actuated therefrom, Fig. 2 is a transverse sectional view of an air motor which may be used in the combination of Fig. 1, with the inlet valve turned out of position for purposes of better illustration, upon an enlarged scale, Fig. 3 is a transverse sectional view upon the line 3—3 of Fig. 2, with the piston turned 90° out of position for purposes of better illustration, Fig. 4 is a transverse sectional view upon the line 4—4 of Fig. 2, with the piston turned 90° out of position for purposes of better illustration.

Referring to Fig. 1, the crankshaft of the engine (not shown) drives the main pulley 110. This pulley 110 drives the fan 111 through the belt 115 and the pulley 112. The belt 115 also drives the pulley 114, which pulley 114 is provided with an extension pulley 116 turning therewith. The pulley 116 drives the pulley 118 through the belt 117. The pulley 118 drives the air compressor 119, which compressor is mounted on the generator casing 113. The generator casing 113 is mounted by brackets 121 on the engine structure (not shown).

The air compressor 119 derives its air supply through the filter 122 and forces compressed air through the conduit 123 to the receiver 124, which is provided with an outlet valve 125. A lubricant return pipe 126 is provided extending from the receiver 124 to the inlet connection 127 from the inlet filter 122 to the outlet box 128 of the compressor 119.

From the air receiver 124 the flexible conduit 129 extends to the valve 130 of the air motor A, to which motor the present invention is particularly directed.

The air motor A drives the polishing head 131, diagrammatically shown. Instead of the polishing head, there may be provided other devices, useful for polishing, cutting, cleaning, pumping, sawing, lifting, abrading, fitting, and so forth.

The air motor is best shown in Figs. 2 to 4.

As shown in Figs. 2 to 4, the air motor is provided with a casing 10 having the semi-circular half elements 11 and 12. The half elements 11 and 12 are provided with the flanges 13 and 14, said flanges being bolted together at 15. The casing 10 is provided with the tubular extensions 16 and 17, the extension 16 being threaded as indicated at 18 and receiving the threaded nipple 19. The contacting shoulders 20 and 21 limit insertion of the nipple 19.

The other side of the nipple 19 is provided with a conical casing 22, which receives the frusto-conical valve element 23 which is shouldered at 24 to receive the spring 25. The spring 25 presses against the valve cap 26 to force said conical valve 23 tightly in position against the conical interior wall 27 of said valve casing 22.

The end of the conical valve structure 130 is provided with an extension 29 which is shouldered at 30 to receive the handle member 31. The handle member 31 is held in position by the washer 32 and the bolt 33. The bolt 33 is threaded into the recess 34 in the end of said conical valve element 23. The side of the valve 130 is provided with an extension 35 which is threaded to receive the pipe coupling 36. The pipe coupling 36 holds the end of the conduit 129 in position.

As shown in Fig. 2, the valve 23 has a right angle passage 37 which communicates with the passage 38 in the conduit 129 and the passage 39 in the inlet nipple 16 to permit air or fluid under pressure to flow from the compressor or storage chamber 119 through the conduit 129 into the chamber 10. The other projecting nipple 17 receives the cap 40 by the threaded nipple 41. The cap 40 has perforated walls 42, through which air may be exhausted or admitted.

The interior of the cap is filled with filtering means, such as steel wool, as indicated at 44 and its end is closed by the screen 45. The steel wool or other filtering material 44 will prevent grease and dirt from dripping or passing out of the casing 10 onto the object being worked upon by the device.

The moving element or piston P of the motor A consists of a central element 46 having a diametral bore 47 in which fit the open ends of the cups 48 and 49 forming the piston. The ends of the cups are rounded as indicated at 50. The interiors of the rounded ends are shouldered to receive the buffer plates 51 against which react the spring 52. The spring 52 extends between the buffer plates 51 through both of the cylinders or caps 48 and 49.

The bore 47 adjacent its center portion is provided with a groove 53 for lubrication purposes.

The sides of the element 46 (see Fig. 3) are provided with extensions 54 and 55. The sides of the element 46 bear against the disks 56 and 57. The elements 56 and 57 are provided with sleeves 56a and 57a which also serve as bearings for the elements 54 and 55.

The end of the shaft element 54 is provided with a recess 58 which supplies lubricant through the passage 59 to the groove 53. This will lubricate the sliding movement of the piston cups 48 and 49 in the bore 47.

The element 56 has an end closure 60 which receives Zerk or other grease or lubricant inlet fitting 61. The other end of the shaft at 62 receives the conical drive plug element 63 having a threaded connection 64. The element 63 has a flange 65, to which may be bolted the polisher head 131, as indicated in Fig. 1.

In operation the air under pressure, which comes from the compressor 19, passes through the conduit 129 and the passages 38, 37 and 39 to the interior compartment 66 of the motor A. The interior of the motor A is divided into two compartments 66 and 67 by the piston element P. Air under pressure admitted into the compartment 66 will cause a rotary movement of the piston P and of the element 46 in the direction indicated by the arrow 68 in Fig. 2.

As the piston P moves from the position as shown in Fig. 2, the lower end of the piston will first move over the inlet port 39 and cut it off from the compartment 66 and the compressed air in the compartment 66 will then expand, causing the piston to continue its turning movement in the direction 68. As soon as the inlet port 16 has been cut off from the compartment 66, the compartment 67 will be reformed at inlet port side of the element 46 and receive air or other fluid under pressure from the conduit 39.

In the meanwhile the air from the other compartment 69 will be exhausting through the outlet connection 17. This exhaustion will continue until the end of the valve cup 48 passes over the outlet connection 17.

As soon as this passsage is completed the compartment 66 will be opened to the exhaust 17.

It is thus apparent that the compartments 66 and 67 alternatively open and close to the inlet and outlet ports 16 and 17 and increase and decrease in volume, depending upon the position of the piston 48 and 49 inside of the chamber 10. This operation will cause rotation of the element 46 and rotation of the drive shaft 55, which will in turn drive the tool, which is attached to the flange 65.

It will be noted by comparing Figs. 2 and 4, that when the piston P is in the position 90° away from that shown in Fig. 2, the width of the casing will be much smaller. The piston P in this position is contracted since the two cups 48 and 49 in the opening 47 may move toward or away from each other upon compression or expansion of the spring 52.

Opening or closing of the valve 26 controls the speed of the motor and the flow of air or other fluid under pressure into the casing 10 and other suitable controls may also be provided.

A particular feature of the present invention resides in providing the contractile piston with semi-spherical head portions 50. The periphery of the central carrier body 46 is also of semi-spherical contour as shown in Fig. 3. This assures better sealing and facilitates the pump operation and gives more even wear so that the pump does not have to be serviced too frequently. There are no corners to wear off. The spring 52 always presses the semi-spherical head portions into the peripheral recess of the casing and will thus assure a constant seal.

The lubricant supplied to the groove 53 will pass through the sliding bearing 47 and will lubricate the sliding surfaces of the piston and casing, the exterior of the piston and interior of the casing being covered by oil or other lubricant at all times.

It is thus apparent that the present applicant has devised a compact, efficient, simple air pump or air motor construction, as best shown in Figs. 2 to 4, which may conveniently receive pneumatic pressure from some source of supply in and about an automotive engine or if desired from any other source of supply. This pneumatic motor may be utilized to drive various types of polishing, pumping, cleaning, lifting, abrading, sawing, cutting, fitting and other devices. It is obvious that the device shown in Figs. 2 to 4 may also be actuated to pump air or to create a vacuum and that it may be actuated from other sources of power than an automobile engine.

Many other changes could be effected in the particular features of power driven devices designed, and in methods of operation set forth, and in specific details thereof, without substantially departing from the invention intended to be defined in the claims, the specific description herein merely serving to illustrate certain elements by which, in one embodiment, the spirit of the invention may be effectuated.

What is claimed is:

1. In an automobile accessory for an automobile of the type having a source of pneumatic pressure, a pneumatic motor driven from said source, said motor having a flat round casing, the periphery of which has a semi-circular cross section and an elongated hollow cylindrical piston member, the ends of which are closed and are rounded to a semi-spherical contour to closely conform to the rounded semi-circular cross section.

2. In an automobile accessory for an automobile of the type having a source of pneumatic pressure; a pneumatic motor driven from said source, said pneumatic motor having a flat cylindrical casing with inlet and outlet connections, a rotating elongated hollow cylindrical piston therein and a rotating mount for said piston connected to said device, the periphery of said casing having a semi-circular cross section and the ends of said piston being closed off and having a semi-spherical cross section closely conforming to the periphery of said casing.

3. In a working tool actuated by power derived from a portable power source; a pneumatic motor driven from said source, said pneumatic motor having a flat cylindrical casing with inlet and outlet connections, a rotating piston therein, and a rotating mount for said piston connected to said device, said piston being formed of two cylindrical segments, the exterior ends of which are semi-spherical and enclosed spring means pressing said segments apart into contact with said casing, said spring means extending entirely through said mount.

4. The tool of claim 3, said mount being eccentrically mounted in said chamber and carrying a lubricating system to supply lubricant to said piston.

5. A fluid motor comprising a relatively flat circular casing, the periphery of which is rounded so as to have a radial cross section of semi-circular contour, a mounting member positioned eccentrically in casing, said mounting member being also flat and having a rounded edge portion of semi-circular cross section closely conforming and contacting with one side of said casing so as to seal said side of said casing, the sides of said mounting member closely contacting with the interior side of said casing, a bore extending centrally through said mount between the diametrically opposite points on the periphery thereof, a piston composed of two cylindrical-like piston elements sliding inside the bore, the outside ends of which elements are of semi-spherical contour to conform closely to the semi-circular contour of the interior of the casing and a coil spring running through said bore and pressing said piston elements apart.

6. A fluid motor comprising a relatively flat circular casing, the periphery of which is rounded so as to have a radial cross section of semi-circular contour, a mounting member positioned eccentrically in casing, said mounting member being also flat and having a rounded edge portion of semi-circular cross section closely conforming and contacting with one side of said casing so as to seal said side of said casing, the sides of said mounting member closely contacting with the interior side of said casing, a bore extending centrally through said mount between the diametrically opposite points on the periphery thereof, a piston composed of two cylindrical-like piston elements sliding inside the bore, the outside ends of which elements are of semi-spherical contour to conform closely to the semi-circular contour of the interior of the casing and a coil spring running through said bore and pressing said piston elements apart, said mounting member carrying a lubricating system having an inlet at one side of the mounting member and having a passage communicating with the interior of the piston between the elements thereof.

7. In a combination including an automotive engine having an air compressor driven by the automotive engine and a receiver to receive compressed air from said compressor; a pneumatic motor comprising a flat casing with parallel side walls having a periphery of semi-cylindrical cross section, a rotatably mounted eccentric carrier element positioned in said casing with its sides in close contact with the interior sides of said casing, and a hollow elongated cylindrical piston member extending diametrically through said casing and said carrier, the exterior ends of said piston member being closed off and having a semi-spherical contour so as to closely contact the periphery of said casing, said piston member being split and the split portions being pressed apart into contact with said periphery by an enclosed coil spring.

LEON J. L. GEERAERT.
WILLIAM LUSH.